United States Patent [19]

Tsuda et al.

[11] Patent Number: 4,707,188
[45] Date of Patent: Nov. 17, 1987

[54] CEMENT COMPOSITION FOR UNDERWATER CONCRETING

[75] Inventors: Kenji Tsuda; Nobuyoshi Matsumoto; Masahide Tsukagawa, all of Himeji, Japan

[73] Assignee: Daicel Chemical Industries, Ltd., Osaka, Japan

[21] Appl. No.: 916,243

[22] Filed: Oct. 7, 1986

Related U.S. Application Data

[63] Continuation of Ser. No. 741,978, Jun. 6, 1985, abandoned.

[30] Foreign Application Priority Data

Jun. 7, 1984 [JP] Japan .................................. 59-115515

[51] Int. Cl.$^4$ .............................................. C04B 24/38
[52] U.S. Cl. ...................................... 106/93; 106/314; 166/293
[58] Field of Search ................... 106/93, 314; 166/293

[56] References Cited

U.S. PATENT DOCUMENTS

| 3,881,552 | 5/1975 | Hessert | 166/294 |
| 4,069,869 | 1/1978 | Sandiford | 166/270 |
| 4,258,790 | 3/1981 | Hale | 166/293 |
| 4,396,433 | 8/1983 | Brandt et al. | 166/294 X |
| 4,502,887 | 3/1985 | Tsuda | 106/93 |

FOREIGN PATENT DOCUMENTS

| 54-122336 | 9/1979 | Japan | 106/93 |
| 60-260456 | 12/1985 | Japan | 106/93 |

Primary Examiner—Mark L. Bell
Assistant Examiner—A. Knab
Attorney, Agent, or Firm—Flynn, Thiel, Boutell & Tanis

[57] ABSTRACT

A cement composition is suitable for underwater concreting and comprises 100 parts by weight of cement and 0.1 to 2.0 parts by weight of carboxymethyl hydroxyethyl cellulose.

6 Claims, No Drawings

CEMENT COMPOSITION FOR UNDERWATER CONCRETING

This is a continuation of application Ser. No. 741,978, filed June 6, 1985 now abandoned.

FIELD OF INDUSTRIAL APPLICATION

This invention relates to a cement composition for direct underwater concreting which has a very great thickening capacity, low air entrainability, and superior fluidity.

When fresh concrete is directly placed in water not using tremies or shuttering plates, the cement gets scattered in water as the concrete is lapped by adjoining water at the time of placing, or cement is diffused or eroded or partially flows out of the concrete by the action of water streams and waves even after placing the concrete so that the concrete is deformed in the course of its hardening. Such being the case, it can no longer be hardened enough, or the hardened product, if developed, is eventually inferior in strength.

Therefore, in order to prevent cement from scattering in water during its underwater placing, there has been developed various techniques that use a cement composition incorporated with high-molecular weight additives capable of providing a sufficient consistency. For instance, West German Patent Publication No. 2,326,647 describes in its specification that cement can be prevented from diffusing in water by the addition of cellulose ether, polyacrylamide or the like. Another example, Japanese Patent Laid-Open No. 3921/1982 relates to an underwater concreting technique which illustrates a concrete composition incorporated with polyacrylamide.

Use of a cement composition incorporated with such high-molecular additives having a thickening effect for underwater placing is advantageous in effectively decreasing the diffusion of cement in water but is defective in that the cement composition is decreased in fluidity and its pumping becomes difficult.

For a cement composition capable of underwater placing, it is required that the diffusion of the cement in water is small and that its pumping is easy. Furthermore, for providing a cement composition with a high compression strength, besides the above-mentioned requirements, it is necessary to take additional measures for decreasing the air content in the unhardened composition and for decreasing the water content in the composition by using a cement dispersant such as a water reducing admixtures together.

Water-soluble cellulose ethers, such as hydroxypropylmethylcellulose (HPMC), hydroxyethylmethylcellulose (HEMC), methylcellulose (MC) and hydroxyethylcellulose (HEC), have heretofore been used as admixtures for mortar and concrete. However, these are nonionic polymers that have the property of increasing the air content in the composition (air entrainability) and do not serve as a favorable material with respect to the strength which is essential to the composition. For controlling the air entrainability of these cellulose ethers, it has been found that the air entrainability can readily be reduced by using a cellulose ether and an anti-foaming agent together, but that the composition has its fluidity decreased greatly thereby. In other words, the cement composition containing a nonionic water-soluble cellulose ether is thought to have its fluidity lowered by lowering by the air entrainment of the ether. On the other hand, Japanese Patent Laid-Open No. 3921/1982 relates to an underwater concreting technique utilizing a concrete composition incorporated with a polyacrylamide, whereas it has been known that this polyacrylamide is a polymer with a small air entrainability but that it causes the composition to have a greatly decreased fluidity.

Thus, at the present time, there has not yet been found a polymer having a thickening capacity enough to prevent the cement from diffusing in water and having low air entrainability and satisfactory fluidity.

The present inventors have studied how to solve these technical problems inherent in the conventional cement compositions for underwater concreting and have finally attained the present invention based on the finding that carboxymethylhydroxyethylcellulose (CMHEC) having both hydrophilic anionic and hydrophilic nonionic groups, which belongs to ionic high polymers and has heretofore been thought to be unfit for use because of the gelling by calcium ions in a cement/water admixture system where calcium ions are predominant (see e.g., Japanese Patent Laid-Open No. 123850/1982), is a superior polymer with the aforesaid desirable properties.

SUMMARY OF THE INVENTION

According to the invention, a cement composition suitable for underwater concreting comprises 100 parts by weight of cement and 0.1 to 2.0 parts by weight of carboxymethyl hydroxyethyl cellulose. It overcomes the above discussed problems and has the above mentioned properties.

Carboxymethyl hydroxyethyl cellulose (CMHEC) for use in the invention is prepared by a known method such as disclosed in U.S. Pat. Nos. 2,618,632 and 3,446,795 and Japanese patent publication A (unexamined) No. 18586/73. The method is conducted by converting a cellulose into an alkaline cellulose, carboxymethylating it with mono-chloroacetic acid and reacting the product with ethylene oxide for hydroxyethylation, or alternatively, by first hydroxyethylating an alkaline cellulose with ethylene oxide and then reacting the product with monochloroacetic acid for carboxymethylation. The resulting CMHEC has a carboxymethyl group which is in the form of an alkali metal salt, normally a sodium salt.

Carboxymethyl hydroxyethyl cellulose for use in the invention is preferred to have a degree of substitution (DS) of carboxymethyl groups per anhydroglucose unit of at most 2.0 and a molar substitution of ethylene oxide (MS) per anhydroglucose unit of 1.2 to 7.0.

Carboxymethylcellulose (CMC), which is a cellulose ether having only hydrophilic anionic groups when it is used in a cement/water admixture system, becomes separated as it gels by the crosslinking between the carboxymethyl group and the calcium ion. When the CMC has incorporated a nonionic hydroxyethyl group however, the obtained product becomes usable even in a cement/water admixture system, because the gelation due to the bonding of the carboxyl group and the calcium ion is moderated considerably. In addition, the product is provided with a far greater thickening capacity than that of the CMC having only anionic hydroxyethyl groups, and therefore has a greater effect of preventing cement from diffusing in water.

The greater the DS of the carboxymethyl groups in the CMHEC, the lower the air entrainability of the cement composition and the better its fluidity. If the DS is greater than 2.0, however, the gelation due to calcium ions occur excessively, so that the fluidity of the cement composition is lowered. If it is smaller than 0.01, the inhibitory effect on air entrainment becomes nearly zero. Accordingly, a suitable DS of carboxymethyl groups should be at most 2.0, more preferably in a range of 0.01 to 2.0.

On the other hand, if the CMHEC used in this invention has hydroxyethyl groups with a MS of smaller than 1.2, the cement incorporated therewith will require too long a time for its setting. If the MS is greater than 7.0 the air entrainability becomes too great, and the hardened product will have a low strength. Accordingly, the suitable MS of hydroxyethyl groups should be in a range of 1.2 to 7.0.

The CMHEC used in this invention should have a viscosity of 100 to 7,000 cps in its 1% aqueous solution at 25° C. The CMHEC, because of the interaction between the carboxymethyl group and the calcium ion in its molecule, has a greater thickening capacity than hydroxyethylcellulose or hydroxypropylmethylcellulose which has the same viscosity, in a cement/water admixture system. However, having a lower viscosity than 100 cps will not afford a satisfactory thickening capacity or enough of an effect of preventing cement from diffusing in water, while having a greater viscosity than 7,000 cps gives poor fluidity.

If the CMHEC is added in too small an amount to cement, it will not be effective enough to the prevent the cement from diffusing in water or to improve its fluidity. If it is added in too great an amount, the cement will have a decreased fluidity because its air content is increased and its consistency also becomes too high. The cement will also require a long time for setting. Accordingly, an optimum amount of the CMHEC is essentially in the range of 0.1 and 2.0 parts by weight based on 100 parts by weight of cement.

In this invention, various additives which are generally used may also be added, besides the CMHEC, to improve the cement composition. The additives which may be added, if necessary, include water reducing admixtures such as ligninsulfonates, melamine/formalin resin sulfonates and highly condensed triazine compounds and setting accelerators such as calcium chloride, sodium aluminate, calcium formate and the like.

This invention will now be illustrated by the following examples.

EXAMPLE

A mixture of 600 g of Portland cement, 300 g of water and 1,200 g of river sand, incorporated with 3 g of additives, was kneaded in a manner according to JIS R-5201. The resulting fresh mortar was tested for air content, fluidity (depth of penetration) and turbidity of water. The testing methods were as follows.

(1) Air content of fresh mortar

The air content was determined according to the testing method for "air content" as stipulated in the Japan Housing Public Corporation's "Quality Identification Standard for Plasterer's Mortar Admixture (draft)."

(2) Fluidity (depth of penetration under 2.0 kg)

The depth of penetration of a 2.0 kg plunger into mortar was determined according to the testing method for "workability" as stipulated in the Japan Housing Public Corporation's "Quality Identification Standard for Plasterer's Mortar Admixture (draft)."

(3) Turbidity of water 150 g of fresh mortar was dropped in several divisions onto the surface of 1 l of water contained in a 1-l measuring cylinder. After 5 seconds, 10 ml of turbid water was sampled out of a depth of 400-ml line with a transfer pipette, and its turbidity was observed by a colorimeter. Separately, calibration lines for turbidity and SS (ppm) were prepared, using purified kaolin, so that the observed turbidity was converted to SS.

In addition, a Portland cement paste was prepared by mixing 100 parts by weight of cement and 0.625 part by weight of the additives and tested to determine a setting period of time in the way as shown in JIS R-5201.

Table 1 shows the testing results observed from cement compositions incorporated with CMHEC samples varying in DS values of carboxymethyl groups and MS values of hydroxyethyl groups, commercially available hydroxyethyl cellulose (HEC-UNICEL QP-30000, a tradename of Daicel Chemical Industries, Ltd.), commercially available hydroxypropyl methylcellulose (Metholose 90SH-30000, a tradename of Shin-Etsu Chemical Industry Co., Ltd.), and a mixture of each of the above mentioned HEC and HPMC and 0.05 part by weight, per 100 parts by weight of cement, of a commercially available anti-foaming agent, SN Defoamer 14HP, a tradename of Sun Nopco Co.

It is evident from Table 1 that the cement compositions incorporated with the HEC or HPMC alone caused the water to become highly turbid as the cement could not be prevented from diffusing in the water and the fresh mortar had a high air content. The same compositions incorporated with the HEC or HPMC plus an anti-foaming agent caused the water content to decrease, whereas no improvement was observed in turbidity.

In contrast, the cement composition of this invention, incorporated with 0.5 part by weight, per 100 parts by weight of cement, of the CMHEC, allowed the air content to decrease to 10% or lower, even in the absence of any anti-foaming agent, and exhibited small turbidity and satisfactory fluidity.

The setting time was found to be greatly affected by the MS of hydroxyethyl groups rather than by the DS of carboxymethyl groups, and the setting time became too great when using a CMHEC having a smaller MS value than 1.2.

The cement composition for underwater concreting according to this invention is free from diffusion into water even when it is placed in water directly yet has a sufficient strength after hardening because of its low entrained air content. Moreover, in spite of its low air content, it has satisfactory fluidity, so that pumping can be facilitated and the field workability improved greatly. By the incorporation of the CMHEC alone, without the necessity of adding an anti-foaming agent or the like, the cement can effectively be prevented from diffusing in water. This invention thus provides a cement composition for underwater concreting which is highly advantageous in economy, as well as in workability.

TABLE 1

| | Additive | | | | Physical property of fresh mortar | | Turbidity of water SS (ppm) | Setting time | | General evaluation |
|---|---|---|---|---|---|---|---|---|---|---|
| No. | Material | DS | MS | Viscosity of 1% solution at 25° C. (cps) | Air content (%) | Depth of penetration (mm) | | Initiated (hr-min) | Terminated (hr-min) | |
| Example | | | | | | | | | | |
| 1 | CMHEC | 0.45 | 1.44 | 1816 | 5.6 | 91 | 3.6 | 8-50 | 11-12 | ○ |
| 2 | " | 1.27 | 1.86 | 1150 | 3.7 | 94 | 3.2 | 9-05 | 13-05 | ○ |
| 3 | " | 0.91 | 2.22 | 1050 | 9.8 | 107 | 3.0 | 7-20 | 10-00 | ◎ |
| 4 | " | 1.31 | 3.03 | 1500 | 4.2 | 100 | 4.5 | 4-15 | 5-55 | ◎ |
| 5 | " | 1.35 | 3.41 | 1050 | 5.8 | 110< | 3.7 | 3-30 | 4-45 | ◎ |
| Comparative Example | | | | | | | | | | |
| 6 | CMHEC | 0.83 | 0.30 | 1268 | 6.4 | 3 | not measured | 16-00 | 18-30 | X |
| 7 | " | 0.45 | 1.02 | 1026 | 10.4 | 91 | 3.0 | 16-25 | 26-00 | X |
| 8 | HEC | | 2.0 | 1500 | 22.0 | 110< | 21 | | | X |
| 9 | HEC + antifoamer | | 2.0 | 1500 | 2.8 | 92 | 20 | | | X |
| 10 | HPMC | | | 1200 | 18.5 | 110< | 41 | | | X |
| 11 | HPMC + antifoamer | | | 1200 | 3.6 | 90 | 42 | | | X |
| 12 | — | | | | 1.2 | 110< | not measured | 2-40 | 3-40 | X |

In Table 1, Examples and Comparative Examples are each evaluated on the whole in terms of general evaluation based on the obtained results. A mark, "double circles", indicates an excellent level; a mark, "a single circle", shows a good level; and a mark, "x", means an undesirable level.

The embodiments of the invention in which an exclusive property or privilege is claimed are defined as follows:

1. A cement composition, consisting essentially of: water, aggregate, 100 parts by weight of hydraulic inorganic cement, and from 0.1 to 2.0 parts by weight of carboxymethylhydroxyethylcellulose (CMHEC), said CMHEC having a carboxymethyl degree of substitution of from 0.01 to 2.0 per anhydroglucose unit, said CMHEC having an ethylene oxide molar substitution of at least 3.03 to 7.0 per anhydroglucose unit, a 1% aqueous solution of said CMHEC having a viscosity of 100 to 7000 cps, at 25° C. so that said CMHEC reduces the amount of the cement that diffuses into water, and maintains a low air entrainability and a fluidity suitable for pumping of the cement composition.

2. A cement composition as claimed in claim 1 in which said 1% aqueous solution of said CMHEC has a viscosity of 1050 to 7000 cps, at 25° C.

3. A cement composition as claimed in claim 1 in which said 1% aqueous solution of said CMHEC has a viscosity of 1050 to 1816 cps, at 25° C.

4. A cement composition as claimed in claim 3 in which said CMHEC has an ethyl oxide molar substitution of from 3.03 to 3.41 and a carboxymethyl degree of substitution of 1.31 to 1.35, per anhydroglucose unit.

5. A cement composition as claimed in claim 2 in which said CMHEC has a carboxymethyl degree of substitution of at least 1.31.

6. A process which comprises introducing a cement composition as claimed in claim 4 into an underwater zone in which a concrete object is to be formed and curing said cement composition.

* * * * *

UNITED STATES PATENT AND TRADEMARK OFFICE
CERTIFICATE OF CORRECTION

PATENT NO. : 4 707 188

DATED : November 17, 1987

INVENTOR(S) : Kenji TSUDA et al

It is certified that error appears in the above-identified patent and that said Letters Patent is hereby corrected as shown below:

Column 6, line 41; change "claim 4" to ---claim 1---.

Signed and Sealed this

Tenth Day of May, 1988

Attest:

DONALD J. QUIGG

Attesting Officer

Commissioner of Patents and Trademarks